United States Patent [19]

Kaji

[11] Patent Number: 5,708,592
[45] Date of Patent: Jan. 13, 1998

[54] MEASURING APPARATUS FOR FIGURES

[75] Inventor: Katsumi Kaji, Tokyo, Japan

[73] Assignee: Ushikata Mfg. Co., Ltd., Tokyo, Japan

[21] Appl. No.: 651,764

[22] Filed: May 22, 1996

[30] Foreign Application Priority Data

May 31, 1995 [JP] Japan ................. 7-133863

[51] Int. Cl.⁶ ............... G01B 21/00; G06F 17/10; G06F 19/00
[52] U.S. Cl. ............... 364/560; 33/121; 33/123; 33/124
[58] Field of Search ................. 364/560, 554, 364/561, 562, 563, 564, 474.29, 463; 348/172; 33/121, 122, 123, 124, 1 C, 1 M, 26, 27.01, 503

[56] References Cited

U.S. PATENT DOCUMENTS

| | | |
|---|---|---|
| 4,127,941 | 12/1978 | Hoover ................. 33/1 C |
| 4,616,419 | 10/1986 | Kubo . | 
| 4,791,576 | 12/1988 | Tanaka et al. .......... 364/474.29 |
| 5,115,569 | 5/1992 | Kubo . |
| 5,515,299 | 5/1996 | Kaji et al. . |
| 5,551,161 | 9/1996 | Kubo ................. 33/503 |

FOREIGN PATENT DOCUMENTS 62-119407 5/1987 Japan ................. G01B 21/02

Primary Examiner—Emanuel T. Voeltz
Assistant Examiner—Tony Cole
Attorney, Agent, or Firm—Greenblum & Bernstein P.L.C.

[57] ABSTRACT

An apparatus for measuring figures having circular arc portions by obtaining coordinates of a starting point, an ending point and an intermediate point of each circular arc. The measuring apparatus measures at least one of coordinates or an area of a figure. The measuring apparatus has a main body and a measuring lever. The main body has a pair of rollers that drive the measuring apparatus in a running direction. The measuring lever is pivotally supported on the main body so as to be rotatable in a clockwise and counter-clockwise direction. The measuring lever includes a tracer, a point key, and an arc key. The point key is manipulated when the measuring lever is at the starting point of the circular arc portion. The arc key is manipulated when the measuring lever is at the intermediate point. The point key again is manipulated when the measuring lever is at the ending point. By obtaining these three points, a parameter of a figure, including the circular arc portion, can be determined.

12 Claims, 11 Drawing Sheets

MEASURING APPARATUS FOR FIGURES

BACKGROUND OF THE INVENTION

1. Field of the Invention

The present invention is directed to an apparatus for measuring an area of a figure, and in particular to measuring coordinates of a centroid of a plane figure by tracing along a profile of the plane figure.

2. Discussion of Background and Other Information

Traditionally, a centroid of a linear figure a-g-f-e-d-c-b-a (see FIG. 3) is found by, for example, dividing the figure into sub-figures having known figure centroids. For example, the figure illustrated in FIG. 3 can be divided into triangle a-b-g, triangle b-g-f, triangle b-f-h, and rectangle c-d-e-h. Geometrical moments of the areas of each sub-figure are individually calculated and summed up, and the summed moment is divided by the total area of the linear figure.

When finding a centroid of a curved figure, such as, for example, as illustrated in FIG. 4, the only way to obtain its centroid is by dividing the figure into a plurality of approximate triangles and applying the same method as above.

However, although the traditional method can obtain an accurate centroid when analyzing linear figures such as illustrated in FIG. 3, the traditional method takes a long time, because the number of calculations to be performed increase with the number of sides of the figure.

Further, it is difficult to obtain an accurate centroid for a curved figure, such as shown in FIG. 4, because of the approximations that are intrinsic to the traditional method. In order to obtain an accurate centroid using the traditional method, the figure must be divided in a very large number of sub-figures, which is difficult to manually do.

In view of the foregoing problems, the present inventor proposed an improved measuring apparatus for a figure in Japanese Patent Application No. HEI 4-208013, which is a counterpart of U.S. Application No. 08/190,882, which issued as U.S. Pat. No. 5,515,299 on May 7, 1996 in the names of Kaji et al. As illustrated in FIG. 1, a measuring apparatus has a main body 1 and a measuring lever 2 pivotally supported by the main body 1 so as to be rotatable in a right or left direction from a running direction of the main body 1 in a horizontal plane. Main body 1 includes means for driving the main body, such as a pair of rollers 5 that are capable of running only in a straight direction, a display 3, an input device 4, and a calculating means, such as a calculating circuit or processor. Measuring lever 2 has a tracer 6 at an end thereof, a point key 9 for entering current coordinates of the tracing part 6, and a marking pointer 7 that is provided proximate the tracer 6. In operation, tracer 6 is moved to trace coordinates, such as an area, and lengths of a figure to be measured. At the same time, the calculating means determines sequential geometrical moments of areas necessary for the calculation of centroids of the figure, and finally determines coordinates of a centroid of the figure by dividing a total geometrical moment of the areas by a sum of the areas of the measured figure. Display 3 provides an indication of a difference of current coordinates of marking pointer 7 from the measured coordinates of the centroid of the figure. The marking pointer 7 is moved until the indicated difference becomes zero.

FIG. 7 illustrates a flow diagram of an operation of the improved measuring apparatus. Step 10 is executed to start the operation when tracer 6 reaches a vertex Pn of a figure to be measured. Coordinates $x_n$ and $y_n$ of the vertex Pn are measured in step 12 and entered into the measuring apparatus. Step 14 determines whether the measured vertex is the last one. If the measured vertex is not the last vertex, step 16 is executed to determine whether the measured vertex is a first one.

If the vertex is a first vertex (e.g., $P_1$), then $P_1$ is set to $P_{n-1}$ in step 15, and the program returns to step 12 to measure the coordinates of a next vertex $P_n$.

If it is determined, in step 14, that the last vertex has been measured, the program proceeds to step 17 to set $P_1$ to $P_n$. The program then proceeds to step 18.

In a similar fashion, if it is determined, in step 14, that the measured vertex is not the last one, and further determines, in step 16, that the measured vertex is a first one, the program proceeds to step 18.

In step 18, an area of an element enclosed by a line between two adjacent vertexes, two lines parallel to the x axis, and the y axis, is calculated. Also, a geometrical moment of the element area for the x axis and a geometrical moment of the element area for the y axis are calculated. Step 20 then determines whether the measured vertex is the last vertex. When the last vertex has not been measured, processing loops from step 20 back to step 12 (via step 21, which sets $P_n$ to $P_{n-1}$) to repeat steps 12–20. When the measured vertex is the last one (e.g., step 20 is affirmative), the program executes step 22, in which it is determined whether a turning direction of the tracing is in a clockwise or counter-clockwise direction.

If it is determined in step 22 that the turning direction of the tracing is counter-clockwise, step 23 is executed to reverse the signs of $Mx_n$ and $My_n$ obtained in step 18 so that they become equal to $-Mx_n$ and $-My_n$ in step 23. On the other hand, if it is determined in step 22 that the turning direction of the tracing is clockwise, step 24 is executed to reverse the sign of $F_n$ calculated in step 18 to become equal to $-F_n$.

Thereafter, step 26 is executed to calculate the coordinates of a centroid of the figure, and the program ends (step 28).

The following description provides a detailed explanation of calculating a centroid of the figure:

The operation of sequential calculations of the geometrical moment of the area of an n-side polygon for the x axis will be described with reference to FIG. 2. A trapezoid having the coordinates $P_1$-$P_2$-$x_2$-$x_1$ is divided into a first triangle $P_1$-$P_2$-$x_1$ and a second triangle $P_2$-$x_2$-$x_1$. A geometrical moment $My_1$ of the area of the trapezoid for the x axis is given by the equation:

$$My_1 = (x_2 - x_1)(y_2^2 + y_2 y_1 + y_1^2)/6.$$

A geometrical moment $My_n$ of the area of a trapezoid formed by an n-th side is calculated given by the following equation, which is executed in step 18 of the flow diagram of FIG. 7:

$$My_n = (x_{n+1} - x_n)(y_{n+1}^2 + y_{n+1} y_n + y_n^2)/6 \qquad (1)$$

Note that equation (1) is applicable for a clockwise trace. If the trace is counter-clockwise, the sign should be reversed.

Similarly, a geometrical moment $Mx_n$ of the area of the trapezoid formed by the n-th side for the y axis is calculated by the following equation, also executed in step 18 of the flow diagram illustrated in FIG. 7:

$$Mx_n = (y_{n+1} - y_n)(x_{n+1}^2 + x_{n+1} x_n + x_n^2)/6 \qquad (2)$$

Note that equation (2) is applicable for a clockwise trace. If the trace is counter-clockwise, the sign should be reversed.

Also note that in equations (1) and (2) above, point $P_{n+1}(x_{n+1}, y_{n+1})$ coincides with point $P_1(x_1, y_1)$ to close the figure.

If the measuring apparatus successively traces all the coordinates of the vertexes $P_1, P_2, \ldots P_n$ of the figure, geometrical moments of area My and Mx can be obtained, respectively, by the following equations:

$$My = \sum_{i=1}^{n} (1/6)(x_{i+1} - x_i)(y_{i+1}^2 + y_{i+1}y_i + y_i^2)$$

$$Mx = \sum_{i=1}^{n} (1/6)(y_i - y_{i+1})(x_{i+1}^2 + x_{i+1}x_i + x_i^2)$$

The geometrical moment of a smaller area E is canceled by a geometrical moment of a larger area D+E (see FIG. 6). Therefore, the geometrical moments $My_n$ and $Mx_n$ of area D, which is the figure to be measured, are obtained by the above equations.

It is generally known that an area S of a figure can be obtained by the following equations:

$$2F = \sum_{i=1}^{n} (x_i + x_{i+1})(y_{i+1} - y_i)$$

where F is greater than 0 for a counter-clockwise trace, and F is less than 0 for a clockwise trace.

$$S = \frac{|F|}{2}$$

where |F| is an absolute value of F.

Note that the trace turning direction can be seen by checking the sign of F. It is therefore not needed to limit the turning direction of the tracing. Hence, the x and y coordinates of a centroid of a figure can be obtained by dividing the geometrical moments $My_n$ and $Mx_n$ of the area by $F_n$ of the n-side polygon (as performed in step 26 of FIG. 7).

However, the improved measuring apparatus can only determine the centroid of the whole figure, by measuring the coordinates of the vertexes, if the figure is a linear figure, as shown in FIGS. 2 and 3. The above-described improved measuring apparatus has difficulties in accurately tracing a figure containing circular arcs, and particularly circular arcs.

SUMMARY OF THE INVENTION

Based on the foregoing, an object of the present invention to provide a figure measuring apparatus that can accurately determine a centroid of a figure having circular arcs by measuring coordinates of three points; both end points and an intermediate point of each circular arc.

According to the present invention, a figure measuring apparatus for measuring coordinates (or an area) of the figures comprises a main body having a pair of rollers capable of running in a single direction, and a measuring lever pivotally supported by the main body so as to be rotatable in a right or left direction from a running direction of the main body in a horizontal plane. The main body includes a display and a calculating means. The measuring lever includes a tracer that traces a contour of the figure to measure the coordinates, areas, or lengths of the figure. The measuring apparatus further comprises first input means, for inputting current coordinates of the tracer into the calculating means, and second input means. When the first input means, the second input means, and then the first input means are sequentially pressed at the three adjacent positions in this order, the calculating means computes parameters of a figure element bounded by a circular arc passing through the three adjacent positions.

According to a feature of a preferred embodiment of the present invention, the measuring apparatus can measure areas of figure elements as the tracer is moved along a profile of the figure. At the same time, the calculating means successively computes geometrical moments of area of the figure elements and sums the geometrical moments of area. The calculating means (circuit) divides the summed geometrical moments of area by an area of the figure to obtain the coordinates of the centroid of the figure. The display indicates differences of the current coordinates of the measuring lever from the coordinates of the centroid of the figure. The measuring lever is moved until the display indicates zero differences, whereby the measuring lever indicates the coordinates of the centroid of the figure.

For circular arc portions in the profile of the figure, the measuring apparatus of the present invention automatically calculates lengths or areas of arched portions bounded by the circular arc portions from coordinates of both end points and an intermediate point of each circular arc entered thereto before adding to or subtracting from that of the whole figure.

Calculations according to the present invention is based on the following theory: in FIGS. 5 and 6, for example, a geometrical moment Mx of the area for an x-axis can be given by the equation $$Mx = \int \int_D y\,dx\,dy$$

where D represents the domain of y=f(x).

The y coordinate of the centroid of the figure is obtained by dividing the geometrical moment Mx by the area A of domain D, as follows:

$$y = \frac{\int \int_D y\,dx\,dy}{A}$$

Similarly, the x coordinate of the centroid of the figure is obtained by dividing the geometrical moment My by the area A of domain D, as follows:

$$x = \frac{\int \int_D x\,dx\,dy}{A}$$

where the geometrical moment of the area is:

$$Mx = \int \int_{D+E} y\,dx\,dy - \int \int_E y\,dx\,dy = \int \int_D y\,dx\,dy$$

It is noted here that when the measuring apparatus moves along an upper portion of profile bounding area D, the measuring apparatus obtains geometrical moment Mx of area D+E and area F of area D+E. On the other hand, when the measuring apparatus moves along a lower portion of the profile bounding area D, the measuring apparatus obtains negative geometrical moment Mx of area D and negative area of area E, because the moving direction on the lower portion of the profile bounding area D is opposite to the moving direction on the upper portion of the curve bounding area D. Therefore, the sum of the geometrical moment Mx obtained by moving along the upper position of area D and the geometrical moment Mx obtained by moving along the lower position of area D means that the geometrical moment Mx of the area is subtracted from the geometrical moment Mx of area D+E.

The measuring apparatus of the present invention calculates the geometrical moment of area by entering coordinates of vertexes of a figure to be measured in the case that the figure is a linear figure, such as shown in FIG. 3.

Further, even if a figure has circular arc profiles in parts thereof, it is not necessary to finely trace the circular arc profiles with the instant invention. Rather, the apparatus of the present invention only measures the coordinates of a start point, an end point, and an intermediate point for each circular arc portion. The calculating means associated with the instant invention calculates an area of an arched portion bounded by the circular arc profile. If a moving direction of the measuring points of the whole figure is the same as that of the three points of the circular arc portion, an area of the arched portion bounded by the circular arc portion is added to the area of a polygon formed by a chord of the arched portion. On the other hand, if the moving directions are reverse, an area of the arched portion bounded by the circular arc portion is subtracted from the area of the polygon formed by a chord of the arched portion. Accordingly, the calculations required to determine the centroid of a figure are simplified.

Since most figures of actual drawings are not given by functions, the profile of the figure is divided into a plurality of small areas and the measuring apparatus sequentially calculates the geometrical moments of the small areas to obtain the geometrical moment of the whole area.

According to an object of the present invention, a measuring apparatus for measuring at least one of coordinates or an area of a figure is disclosed, comprising a main body having a pair of rollers to drive the measuring apparatus in a running direction, a measuring lever that is pivotally supported by the main body so as to be rotatable in a left direction and a right direction relative to the running direction of the main body in a horizontal plane, the measuring lever having a tracer that traces a contour of the figure to be measured, first means for inputting coordinates designating a first location where the tracer is positioned, and second means for inputting coordinates designating a second location where the tracer is positioned when the tracer is located at a point on a circular arc, wherein the main body further comprises a display, and a calculator, wherein the calculator computes geometrical moments $Tx_i$ and $Ty_i$ for an x-axis and a y-axis, the calculator further computing an area $F_i$ of an element defined by successive adjacent coordinates $(x_{i-1}, y_{i-1})$ and $(x_i, y_i)$, where i equals 1 to n, and $(x_n, y_n)=(x_1, y_1)$ inputted by the first inputting means, the calculator adding values of $Ty_i$ and $Tx_i$ and $F_i$ to values of $Ty_{i-1}$, $Tx_{i-1}$ and $F_{i-1}$, respectively, as the measuring lever traces the contour of the figure to be measured, the calculator computing geometrical moments Mx and My for the x-axis and the y-axis and an area $A_{arc}$ of an arched portion bounded by a circular arc passing through the coordinates $(x_{i-1}, y_{i-1})$, $(x_i, y_i)$ inputted by the first inputting means and coordinates $(x_a, y_a)$ inputted by the second inputting means to one of add or subtract the values Mx, My and $A_{arc}$ to $Tx_i$, $Ty_i$ and $F_i$, respectively, the calculator dividing the summed values of $Ty_i$ and $Tx_i$ by the summed value $F_i$, respectively, in order to obtain coordinates of a centroid of the figure after the contour of the figure is completely traced, the display functioning to display a difference of a current coordinate of the measuring lever from a coordinate of the centroid of the figure.

According to an advantage of the instant invention, the first inputting means is manipulated when the tracer is at a starting point and an ending point of the circular arc, the second inputting means being manipulated when the tracer is at an intermediate point of the circular arc, so that the calculator computes at least one of the area and the centroid of the figure of the arched portion bounded by the circular arc portion.

According to another advantage of the instant invention, the calculator adds the area $A_{arc}$ of the arched portion bounded by the circular arc to the area $F_i$ when a tracing rotation direction of the circular arc portion is the same as that of the whole figure. Further, the calculator subtracts the area $A_{arc}$ of the arched portion bounded by the circular arc from the area Fi when a tracing rotation direction of the circular arc portion is opposite to that of the whole figure.

According to an object of the present invention, a measuring apparatus for measuring at least one of coordinates or an area of a figure is disclosed, comprising a main body having a pair of rollers to drive the measuring apparatus in a driving direction, a measuring lever that is pivotally supported by the main body so as to be rotatable in a left direction and a right direction relative to the running direction of the main body in a horizontal plane, the measuring lever having a tracer that traces a contour of the figure to be measured, first means for inputting coordinates designating a first location at which the tracer is positioned, and second means for inputting coordinates designating a second location at which the tracer is positioned when the tracer is located at a point on a circular arc, wherein the main body further comprises a display, and a calculator, the calculator computing a dimensional parameter $F_i$ of an element defined by successive adjacent coordinates $(x_{i-1}, y_{i-1})$ and $(x_i, y_i)$, where i equals 1 to n, and $(x_n, y_n)=(x_1, y_1)$ inputted by the first inputting means, the calculator adding a value of the dimensional parameter $F_i$ to a value $F_{i-1}$ as the measuring lever traces the contour of the figure being measured, the calculator computing a dimensional parameter $A_{arc}$ of an arched portion bounded by the circular arc passing through coordinates $(x_{i-1}, y_{i-1})$, $(x_i, y_i)$ inputted by the first inputting means and coordinates $(x_a, y_a)$ inputted by the second inputting means to one of add and subtract the value $A_{arc}$ from $F_i$ to obtain a dimensional parameter of the whole figure, the display functioning to display a value corresponding to $F_n$ of the whole figure calculated by the calculator.

According to an advantage of the instant invention, the calculator adds the value $A_{arc}$ of the arched portion bounded by the circular arc to the value $F_i$ when a tracing rotation direction of the circular arc portion is the same as that of the whole figure.

According to another object of the instant invention, a measuring apparatus for measuring figures having a circular arc comprises a main body, having means for driving the main body in a running direction and a processor, means for tracing a contour of a figure having a circular arc portion, as the main body is driven in the running direction, to determine a starting point, an ending point and an intermediate point of the circular arc portion, first means for inputting the starting point and the ending point of the circular arc portion, second means for inputting the intermediate point of the circular arc portion, wherein the processor processes the starting point, the ending point and the intermediate point to obtain coordinates of a centroid of the figure after the contour of the figure is completely traced by the tracing means.

Additionally, a display unit is provided that displays a difference between a current coordinate of the measuring apparatus and said centroid of the figure. In addition, the measuring apparatus further comprises a measuring lever that houses the tracing means, the first inputting means and the second tracing means, with the measuring lever being rotatable in a clockwise and a counter-clockwise direction of a horizontal plane relative to the running direction of the main body.

The present disclosure relates to subject matter contained in Japanese Patent Application No. HEI 7-133863 (filed on May 31, 1995), which is expressly incorporated herein by reference in its entirety.

BRIEF DESCRIPTION OF THE DRAWINGS

The foregoing and other objects, features, advantages and manner of operation of the present invention will be apparent from the following more particular description of a preferred embodiment, as illustrated in the accompanying drawings which are presented as a non-limiting example, in which reference characters refer to the same parts throughout the various views, and wherein.

DETAILED DESCRIPTION OF THE PREFERRED EMBODIMENT

A preferred embodiment of the present invention will be described below.

Figure 1:
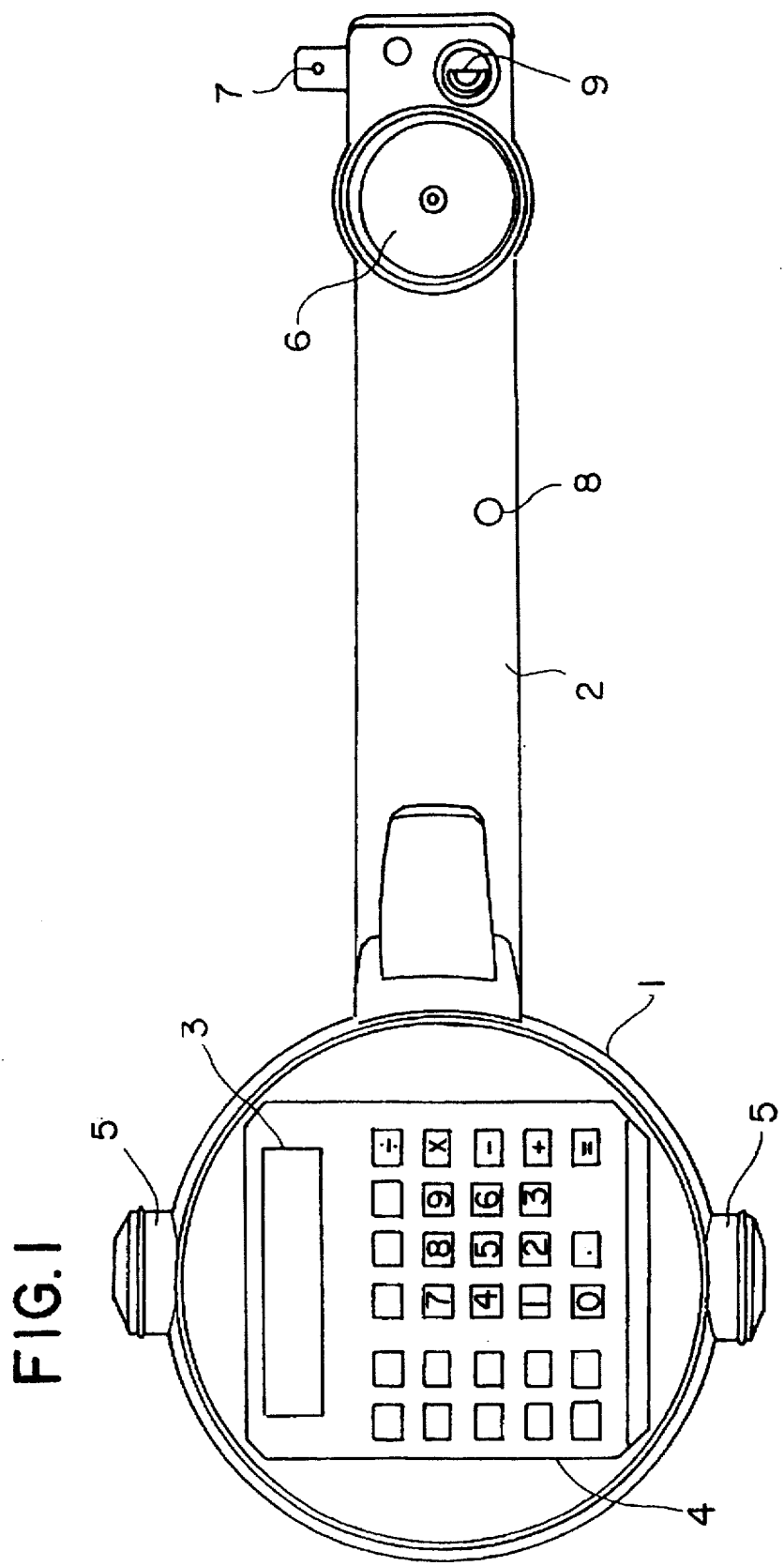
FIG. 1 illustrates a plan view of an apparatus for measuring figures according to the present invention.
Figure 2:
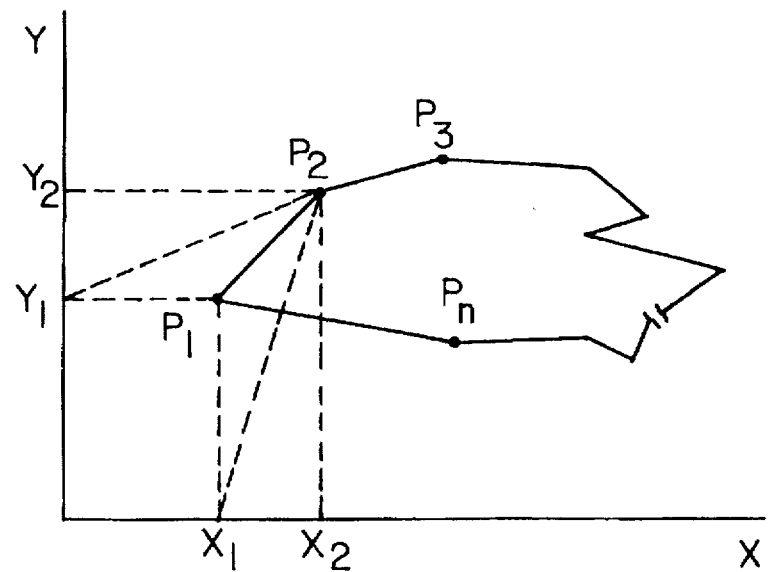
FIG. 2 illustrates a pattern of a linear profile to explain a measurement of a centroid of a figure according to the present invention.
Figure 3:
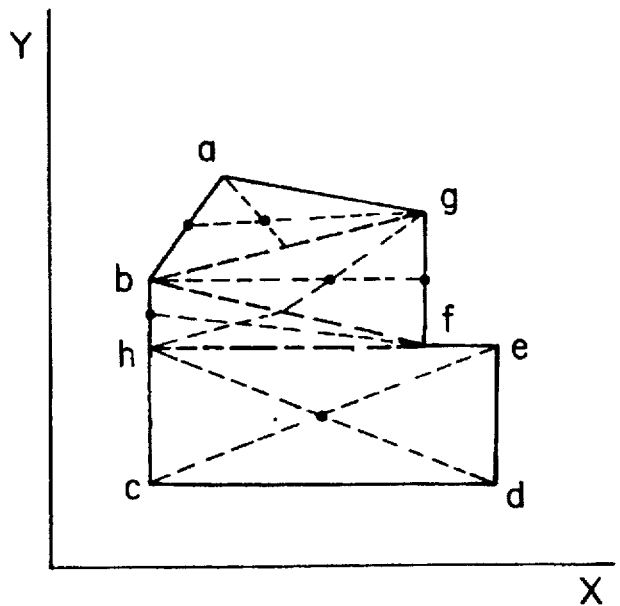
FIG. 3 illustrates a pattern having linear profiles to explain a measurement of a centroid of a figure using prior art methods.
Figure 4:
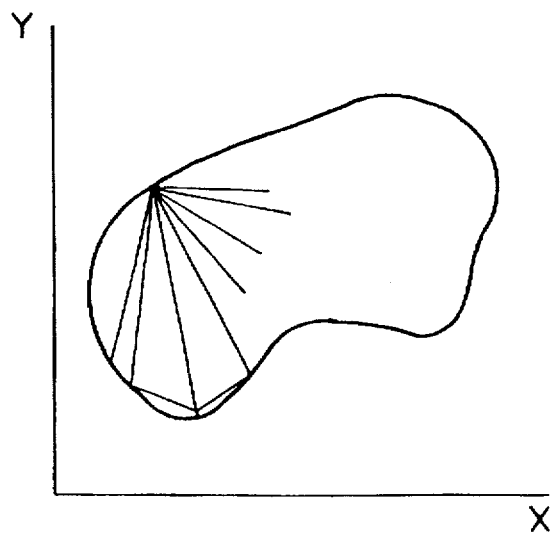
FIG. 4 illustrates a curved profile pattern to explain a measurement of a centroid of a figure using prior art methods.
Figure 5:
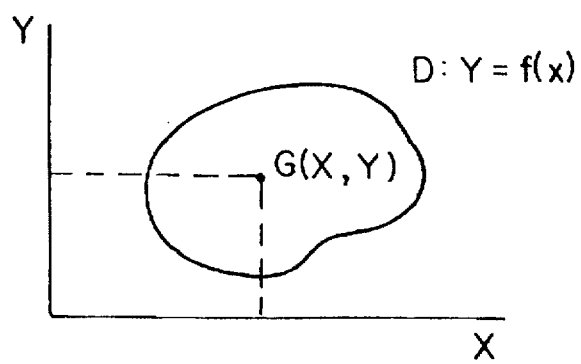
FIG. 5 illustrates a pattern to explain the theory of measurement of a centroid of a figure according to an improved measuring apparatus.
Figure 6:
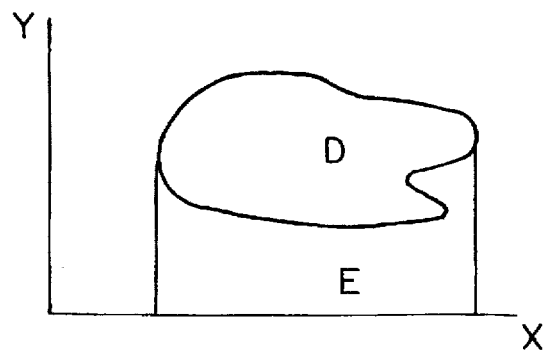
FIG. 6 illustrates another pattern to explain the theory of measurement of a centroid of a figure according to the improved measuring apparatus.

FIG. 1 illustrates a plan view of a figure measuring apparatus constructed according to a preferred embodiment of the present invention. Figure measuring apparatus 10 is similar to the improved measuring apparatus discussed above with respect to Japanese Patent Application HEI 4-208013 and U.S. Pat. No. 5,515,299, except for the addition of an arc key 8, to be described below.

As shown in FIG. 1, the measuring apparatus 10 comprises a main body 1 having a pair of rollers 5, 5 that are capable of running in a single direction, and a measuring lever 2 that is pivotally supported by the main body 1 so as to be rotatable in a right direction or left direction relative to a running direction of the main body 1 in a horizontal plane. The main body 1 includes a display 3, and input means, such as, for example, a keyboard 4. Calculating means (not shown), such as, for example, a calculating circuit or general purpose processor that is programmed to perform a predetermined task (to be discussed below), is housed inside the main body 1.

The measuring lever 2 includes a tracer 6 that functions to trace a contour of the figure to measure coordinates, areas, and lengths of the figure to be measured, a point key 9 that functions to input current coordinates of the tracer 6 into the calculating means, a marking pointer 7 that is provided near the tracer 6, and the arc key 8.

The calculating means computes a plurality of geometrical moments of an area and sums the plurality of geometrical moments of the area, and then divides the summed geometrical moments of the area by an area of the figure to obtain the coordinates of the centroid of the figure. The display 3 indicates differences in current coordinates of the marking pointer 7 from coordinates of the centroid of the figure. Accordingly, measuring lever 2 is moved until the display 3 indicates 0 (e.g., no differences exist), at which time the marking pointer 7 indicates the coordinates of the centroid of the figure.

As noted above, the measuring apparatus 10 of the preferred embodiment further includes an arc key 8. The measuring apparatus 10 calculates a centroid of a figure along a circular arc using three continuous points that are obtained by manipulating the point key 9, the arc key 8 and then the point key 9 again (in this order).

Figure 7:
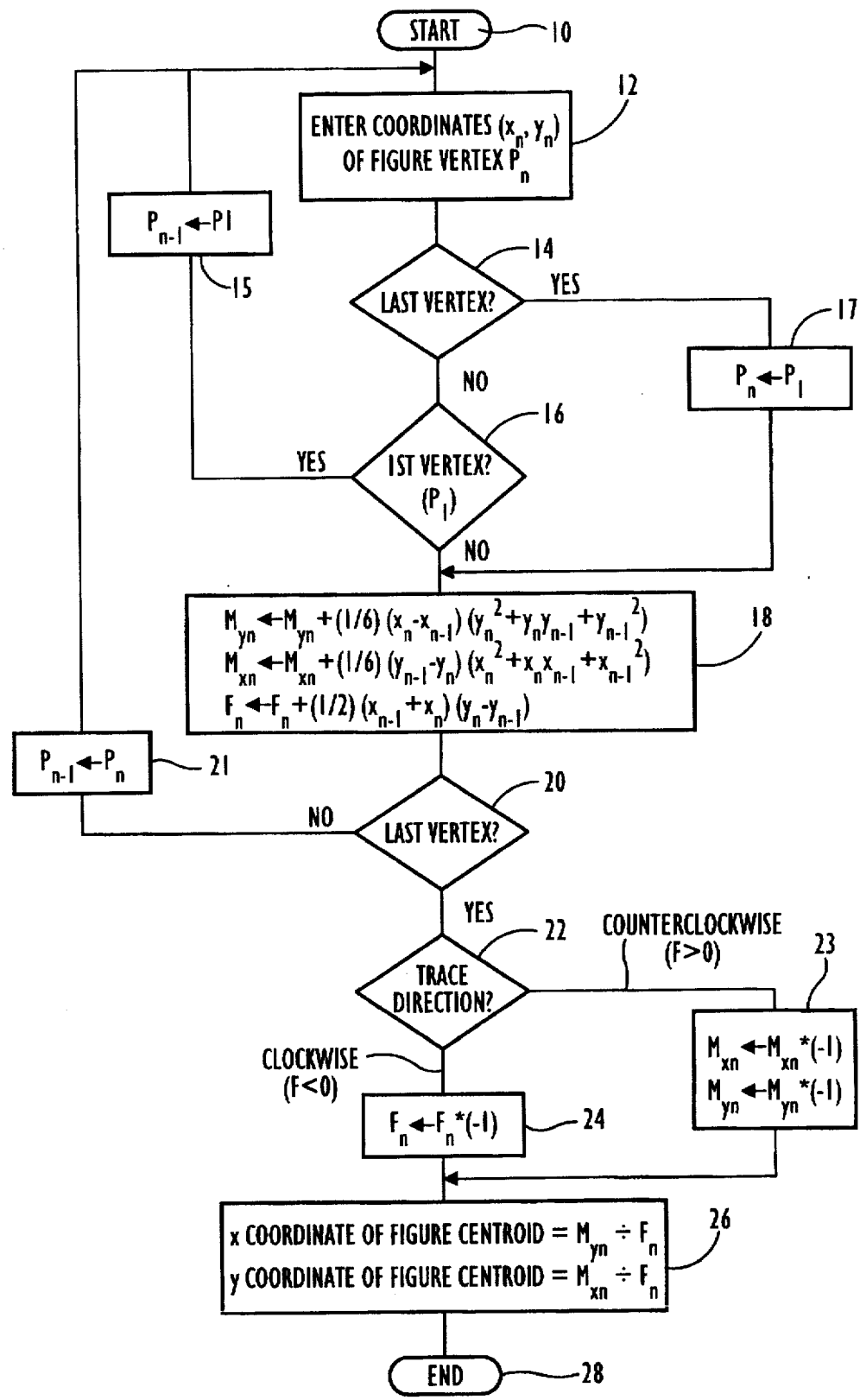
FIG. 7 illustrates a flow chart showing a program operation employed by the improved measuring apparatus.

When determining a centroid of a n-polygonal figure, the improved measuring process discussed above with respect to FIG. 7 may be used. However, if the figure includes a circular arc in at least one of the n-sides of the figure, inaccuracies would result if the process of FIG. 7 is used. Thus, a process (to be discussed below) according to the present embodiment is used.

FIGS. 13–16 illustrate a flow diagram for calculating coordinates $TG_x$ and $TG_y$ of a centroid of a figure that is formed partly (or wholly) of circular arcs in terms of coordinates of vertexes of the figure. It is noted that numerals 1 to 5 that are surrounded by triangles in FIGS. 13–16 denote connection points to associated portions of the flow diagrams in FIGS. 13–16.

Figure 8:
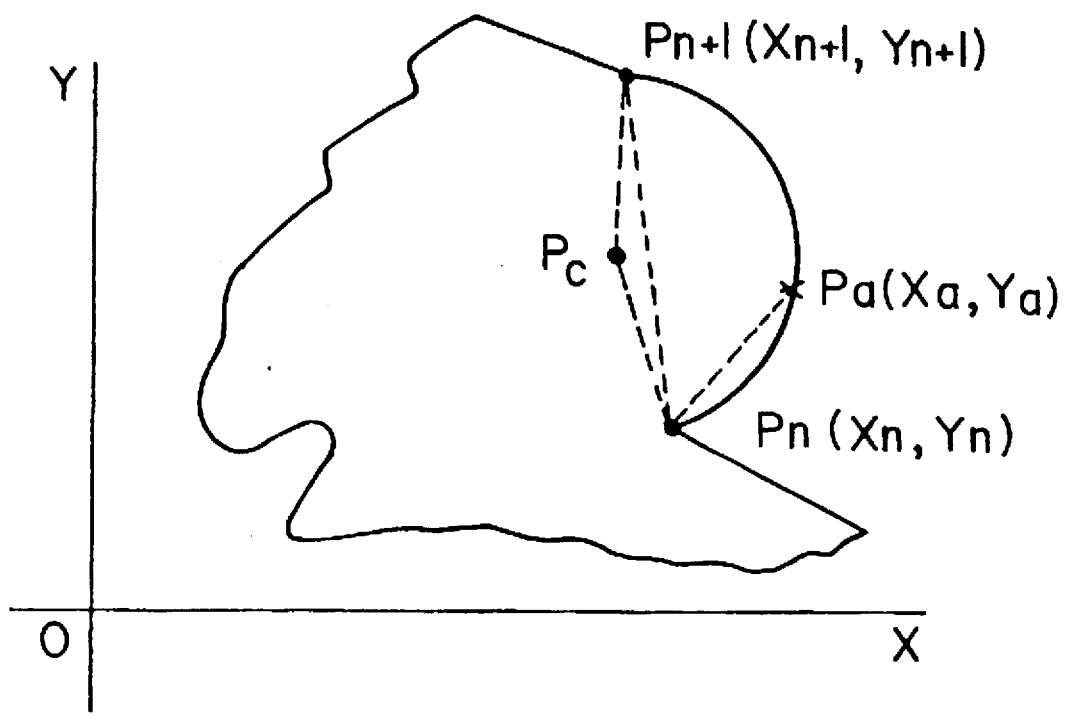
FIG. 8 illustrates a pattern to explain a circular arc portion of a figure for measuring a centroid or area of a figure according to a preferred embodiment of the instant invention.

For purposes of understanding the present invention, $P_n$ denotes a vertex of a profile of a figure, as shown in FIG. 8. When tracer 6 reaches vertex $P_n$ shown in FIG. 8, point key 9 is manipulated to begin the measuring process and measure coordinates $x_n$ and $y_n$ at the vertex $P_n$. The coordinates are inputted into the calculating means (calculating circuit) in step 32. Thereafter, it is determined whether the measured vertex is a last vertex (step 34). If the measured vertex is not the last vertex, step 36 is executed to determine whether the measured vertex is a first vertex (e.g., $P_1$). If the measured vertex is a first vertex $P_1$, $P_1$ is set to $P_{n-1}$ in step 37, before the process returns to step 32 to obtain a next vertex coordinate.

If it is determined in step 34 that the last vertex has been obtained, the process proceeds to step 35 to set $P_1$ equal to $P_n$, before executing step 40, which will be described below. That is, the last point $P_n$ will be the same as the first point $P_1$. Accordingly, the coordinates $(x_n, y_n)$ of the last vertex will be equal to the coordinates $(x_1, y_1)$ of the first vertex.

If it is determined that the last vertex has not been obtained (in step 34) and that the obtained vertex is not the first vertex (in step 36), it is determined in step 38 whether the obtained vertex is a point on a circular arc. This determination is performed by examining the status of arc key 8 to determine whether it has been manipulated (e.g., pressed, or set to an ON state) on the point in question. If it is determined in step 38 that the obtained point is on a circular arc, $x_n$ is set to be equal to $x_a$ and $y_n$ is set to be equal to $y_a$ before the process returns to step 32 to obtain additional coordinates of the vertex $P_n$.

If it is determined in step 38 that the obtained point is not on a circular arc, step 40 is executed. In step 40, a double lateral distance area element $F_n$, a total x-axis moment TX, and a total y-axis moment TY of an element defined by two adjacent vertexes, are calculated on the assumption that no circular arc is included between two adjacent vertexes.

Figure 14:
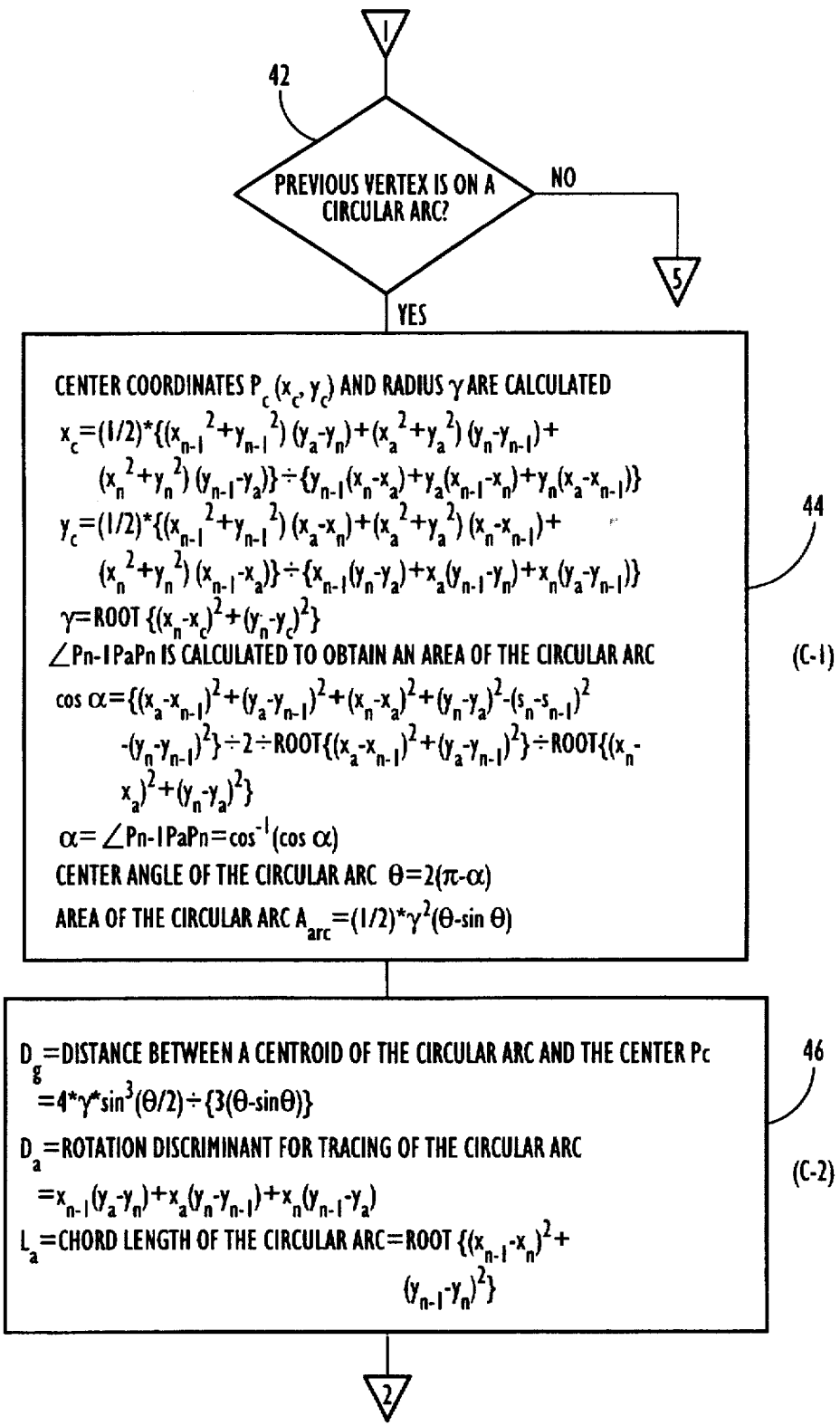
FIG. 14 illustrates a second part of the flow chart for calculating the centroid of the figure and the area of the circular arc portion using the figure measuring apparatus of the present invention.
Figure 15:
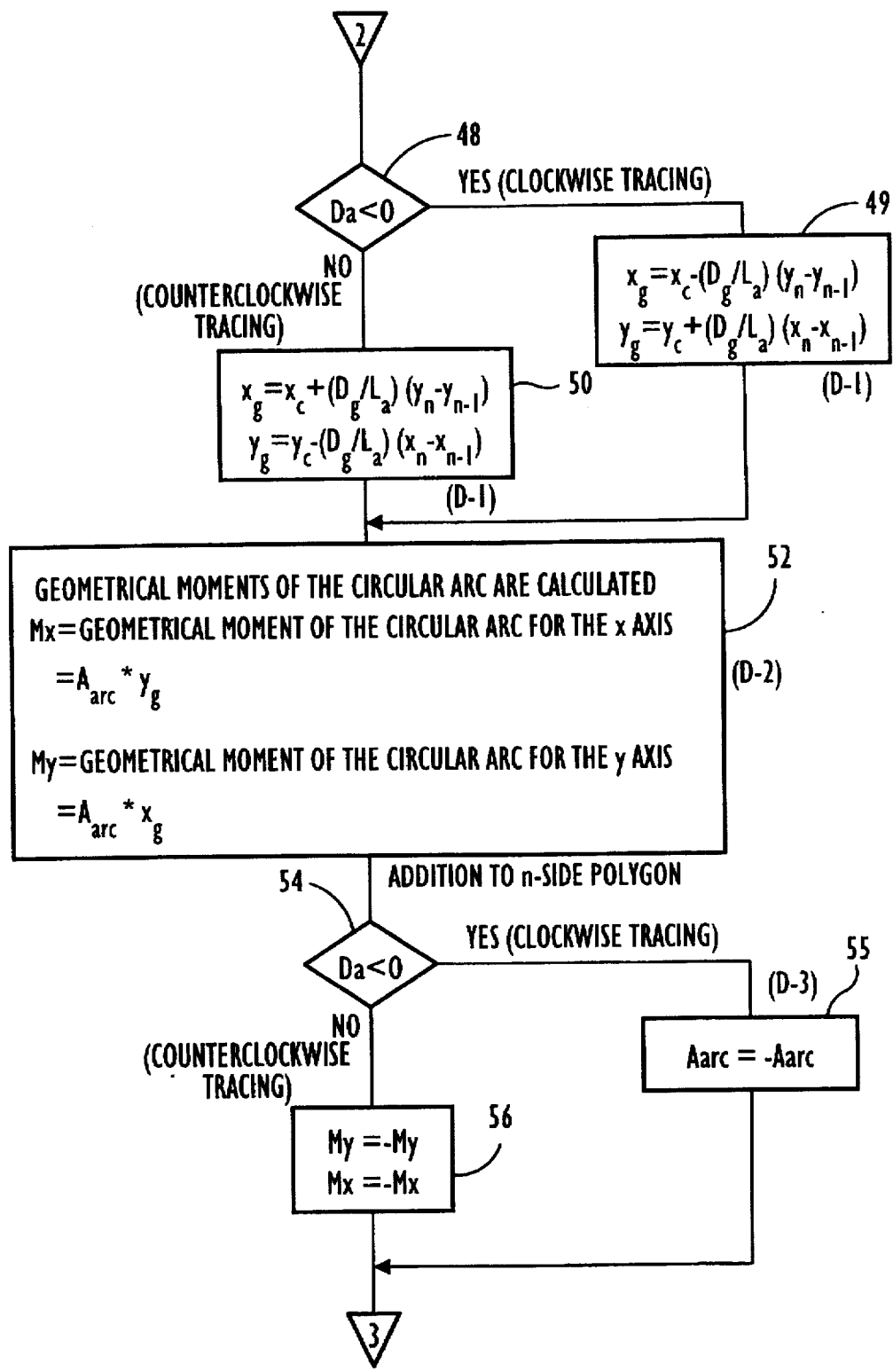
FIG. 15 illustrates a third part of the flow chart for calculating the centroid of the figure and the area of the circular arc portion using the figure measuring apparatus of the present invention.
Figure 16:
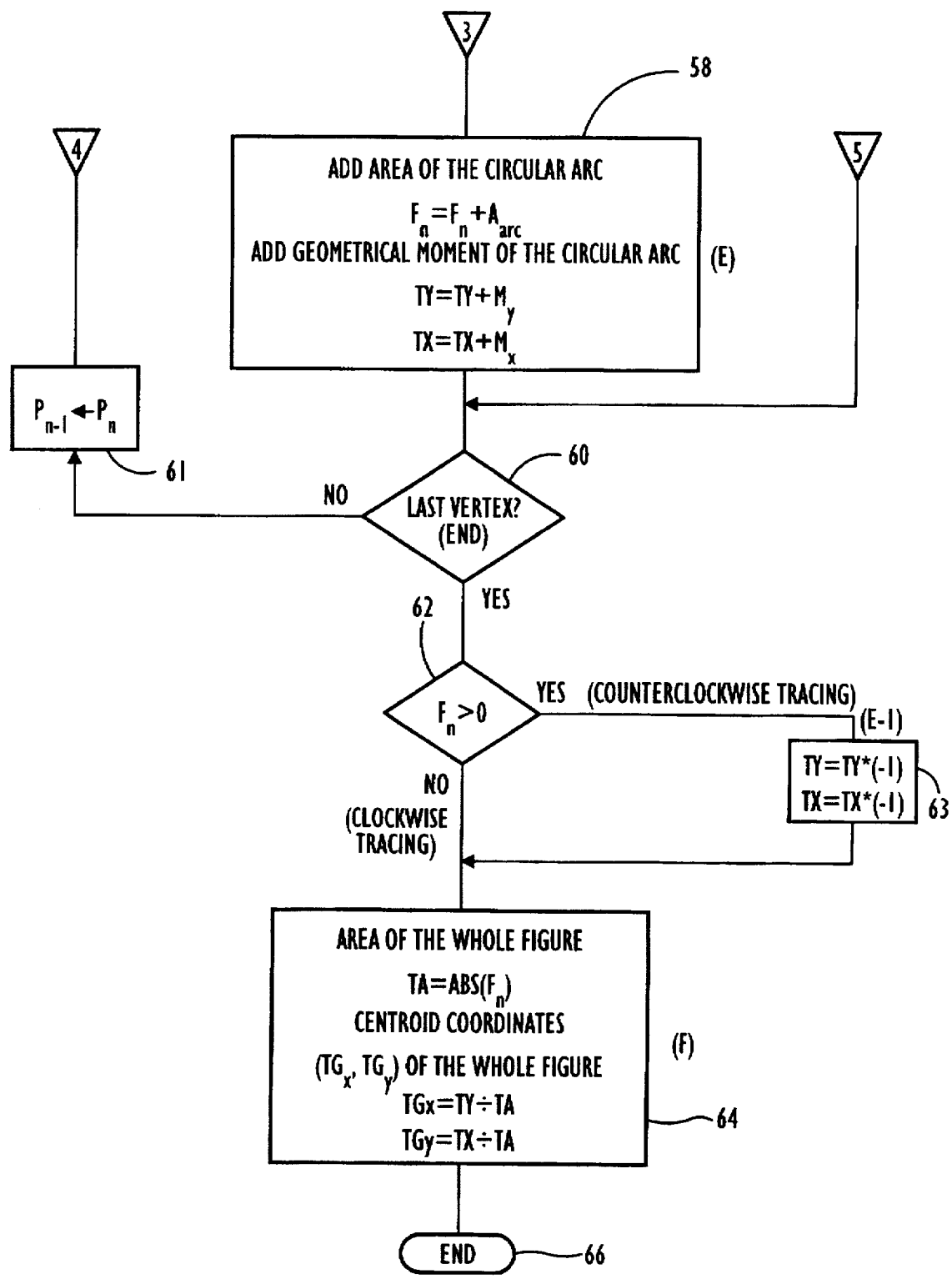
FIG. 16 illustrates a fourth part of the flow chart for calculating the centroid of the figure and the area of the circular arc portion using the figure measuring apparatus of the present invention.

As shown in FIGS. 14 through 16, if the profile is a circular arc (e.g., the previous vertex is determined to be a point on a circular arc in step 42) steps 44 through 58 are executed. On the other hand, if the previous vertex is not on the circular arc, the process proceeds to step 60, to be described below.

In step 44, an attribute radius $\gamma$ of a circle including the circular arc, a center $Pc(x_c, y_c)$ of the circle, a center angle $\theta$ of the circular arc, and an area $A_{arc}$ of an arched portion bounded by the circular arc are calculated by means of three adjacent points $P_n$, $P_{n-1}$, and $P_a$, in which $P_a$ is an intermediate point (e.g., a point on the circular arc). In step 46, a distance $D_g$ between a centroid $(x_g, y_g)$ of the arched portion that is bounded by the circular arc and the center $P_c(x_c, y_c)$, a rotation discriminant $D_a$ for the circular arc trace, and a chord length $L_a$ of the arched portion, are calculated.

As illustrated in FIG. 15, step 48 is executed to determine whether the turning direction of the measurement on the profile of the circular arc is clockwise or counter-clockwise, by examining $D_a$. If $D_a$ is less than 0, processing proceeds to step 49. Otherwise, processing proceeds to step 50. Depending on the result of the examination of $D_a$ in step 48, $D_g/L_a(y_n-y_{n-1})$ and $D_g/L_a(x_n-x_{n-1})$ are subtracted (step 49) or added (step 50) to $y_c$ and $x_c$, respectively, to obtain centroid coordinates $y_g$ and $x_g$, respectively.

Both steps 49 and 50 proceed to step 52, which calculates geometrical moment elements Mx and My of the arched portion that is bounded by the circular arc portion.

Thereafter, the turning direction of measurement (e.g., a clockwise or counter-clockwise direction) of the profile of the circular arc is determined in step 54 by examining $D_a$. If it is determined in step 54 that the turning direction is clockwise, the sign of $A_{arc}$ is reversed by multiplying the value by $-1$ in step 55. Conversely, if it is determined that the turning direction is counter-clockwise, the signs of the geometrical moment elements Mx and My are reversed by multiplying the respective values by $-1$ in step 56.

After step 55 or step 56 is executed, step 58 is executed to obtain geometrical moments TX and TY of the whole figure and cumulative area $F_n$ of the whole figure including the circular arc portions of the figure.

Step 60 is executed to determine whether the last vertex has been obtained. If it is determined that the last vertex has not been obtained, processing returns to step 32, after setting $P_n$ to $P_{n-1}$ (step 61), to repeat the execution of steps 32 to 60. When the last vertex is obtained (meaning that the figure has been completely traced), processing proceeds from step 60 to step 62, in order to determine a measurement turning direction of the whole figure, by examining the sign of the cumulative area $F_n$ of the whole figure. If it is determined in step 62 that $F_n$ is less than or equal to 0, meaning that the turning direction is clockwise, step 64 is executed. However, if it is determined in step 62 that the turning direction is counter-clockwise, the signs of the geometrical moments TX and TY are reversed by multiplying the respective values by $-1$ before proceeding to step 64.

In step 64, area TA of the whole figure is determined, and the total geometrical moments TX and TY of the whole figure are divided by the whole area TA to obtain the centroid coordinates $TG_x$ and $TG_y$ of the whole figure. The process then ends at step 66.

The following description describes the details of steps 40 through 58. FIG. 8 depicts a figure having a circular arc portion between vertexes Pn $(x_n, y_n)$ and $P_{n+1}$ $(x_{n+1}, y_{n+1})$ of an n-sided polygon. An intermediate point (e.g., circular arc point) $P_a$ $(x_a, y_a)$ is optionally determined on the circular arc portion. An area and a centroid of the arched portion bounded by the circular arc portion are calculated using an optional intermediate point, as set forth in equation (3) below.

It should be noted that the signs in the following equations are as indicated if a moving direction of a measuring point at the coordinates of each vertex of the whole polygon including curves is the same as that of the three points of the circular arc portion, and that the signs are reversed if the directions are the reverse.

If $P_c$ $(x_c, y_c)$ denotes the coordinates of a center of a circle that includes the circular arc and $\gamma$ denotes a radius of the circle, when the above-mentioned three points $P_n$ $(x_n, y_n)$, $P_a$ $(x_a, y_a)$, and $P_{n-1}$ $(x_{n-1}, y_{n-1})$ are determined, the equation of the circle is:

$$(x-x_c)^2+(y-y_c)^2=\gamma \qquad (3)$$

The centroid $P_c$ $(x_c, y_c)$ and the radius $\gamma$ can be obtained by solving the simultaneous equations at the three points $P_n$, $P_a$, and $P_{n-1}$, as is performed in step 44 of FIG. 14.

Figure 9A:
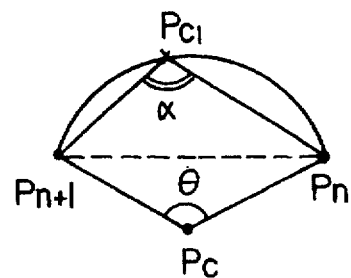
FIG. 9(a) shows a pattern illustrating a small circular arc portion of a figure.
Figure 9B:
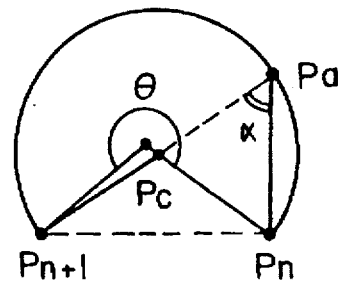
FIG. 9(b) shows a pattern illustrating a large circular arc portion of a figure.

If $\theta$ denotes an angle contained by two lines that connect both ends of the circular arc portion with the center of the circle, as illustrated in FIG. 9, and $\alpha$ denotes an angle contained by two lines connecting both ends of the circular arc portion with the intermediate point on the circular arc portion, the angle $\alpha$ can be obtained by:

$$\cos\alpha = \{(x_a - x_{n-1})^2 + (y_a - y_{n-1})^2 + (x_n - x_a)^2 +$$
$$(y_n - y_a)^2 - (x_n - x_{n-1})^2 - (y_n - y_{n-1})^2\} \div 2 +$$
$$\text{Root}\{(x_a - x_{n-1})^2 + (y_a - y_{n-1})^2 +$$
$$\text{Root}\{(x_n - x_a)^2 + (y_n - y_a)^2\}.$$

Thus, $\alpha = \angle P_{n-1} P_a P_n = \cos^{-1}(\cos\alpha)$.

Since an angle of circumference is equal to an angle of the center divided by two $\theta = 2(\pi - \alpha)$.

If $\alpha \geq \pi/2$, the circular arc portion is a small circular arc (as shown in FIG. 9(a)). If $\alpha < \pi/2$, the circular arc portion is a large circular arc (as shown in FIG. 9 (b)). An area of the arched portion that is bounded by the circular arc portion $P_n P_a P_{n+1}$ is given by:

$$A_{arc} = (\theta - \sin\theta)\gamma^2/2.$$

Figure 10A:
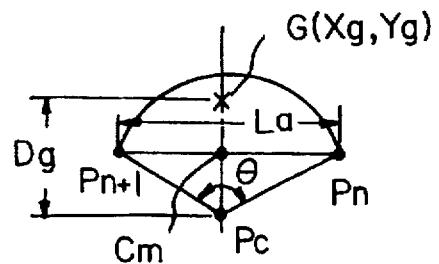
FIG. 10(a) shows a pattern illustrating, in detail, a small circular arc portion of a figure.
Figure 10B:
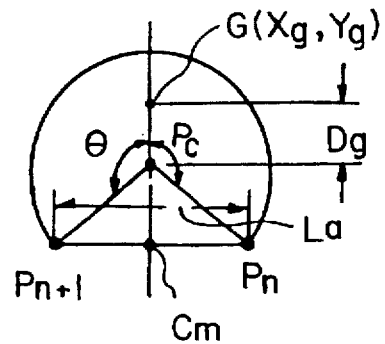
FIG. 10(b) shows a pattern illustrating, in detail, a large circular arc portion of a figure.
Figure 11:
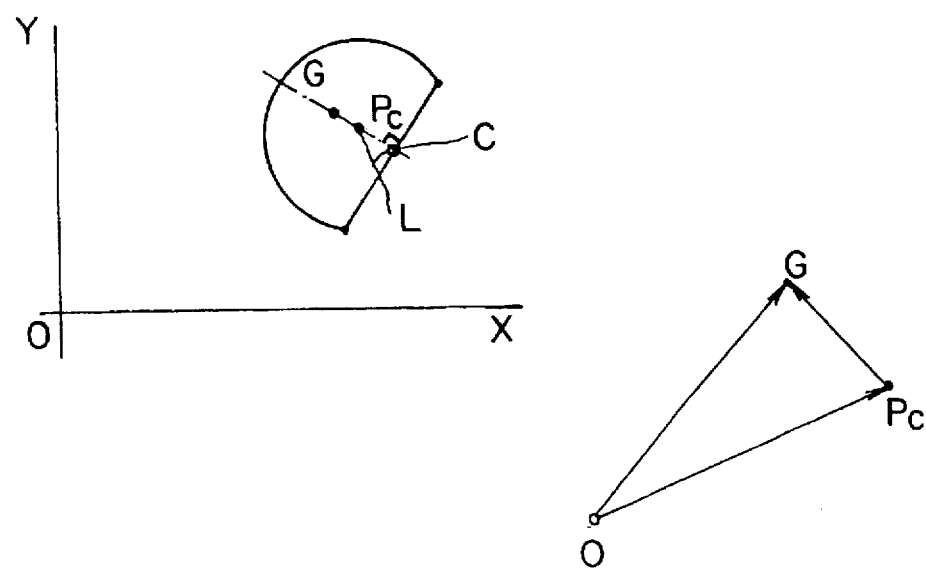
FIG. 11 shows a pattern illustrating coordinates of a circular arc portion of a figure.

The following is performed to find the centroid of the arched portion of the circular arc. Reference should be made to FIG. 10.

If $D_g$ denotes a distance of the centroid $G(x_g, y_g)$ of the arched portion that is bounded by the circular arc portion from the center $P_c$ of the circle, on a center line that passes a center point of the circular arc from the center $P_c$, the distance $D_g$ can be calculated from a geometrical moment of the area of the arched portion bounded by the circular arc shown in FIG. 10, by using the central angle $\theta$ and the radius $\gamma$ of the circle. The geometrical moment of the area of the arched portion for the x-axis, Mx, is given by:

Mx=∬y dydx(area: the circular arc).

Then, the geometrical moment Mx is divided by the area. Accordingly, $$|\vec{P_c G}| = D_g = \frac{4r\sin^3(\theta/2)}{3(\theta - \sin\theta)}$$

Centroid coordinates $(x_g, y_g)$ are determined in accordance with a turning direction of the trace along the arc profile (e.g., a clockwise direction or a counter-clockwise direction). That is, if the turning direction is in a clockwise direction, the centroid coordinates are obtained by:

$x_g = x_c - (D_g/L_a)(y_n - y_{n-1})$, and
$y_g = y_c + (D_g/L_a)(x_n - y_{n-1})$.

On the other hand, if the turning direction is in a counter-clockwise direction, the centroid coordinates are obtained by:

$x_g = x_c + (D_g/L_a)(y_n - y_{n-1})$, and
$y_g = y_c - (D_g/L_a)(x_n - x_{n-1})$.

It is noted that $L_a$ denotes a length of a chord of the circular arc or a length between point $P_n$ and point $P_{n-1}$ such that $L_a = \text{root}\{(x_{n-1} - x_n)^2 + (y_{n-1} - y_n)^2\}$.

The turning direction of the arc is found by determined whether an area of arc triangle C (shown in FIG. 12) is positive or negative. Therefore, rotation discriminant $D_a$ of the circular arc (i.e. the area of the arc triangle C) is given by:

$Da = x_{n-1}(y_a - y_n) + x_a(y_n - y_{n-1}) + x_n(y_{n-1} - y_a)$.

If Da is determined to be greater than 0, the tracing direction is determined to be in a clockwise direction. If Da is determined to be less than 0, the tracing direction is determined to be in the counter-clockwise direction.

The following operations are performed (as illustrated in step 52 of FIG. 15) to calculate the geometrical moments of the area of the arched portion that is bounded by the circular arc for the x-axis and the y-axis:

Assume Mx and My denote geometrical moments of the area of the circular arc for the x-axis and the y-axis. Then, Mx=(area of the arched portion)*(centroid $y_g$ of the arched portion)

$=A_{arc} * y_g$.
$My = A_{arc} * x_g$.

Figure 12:
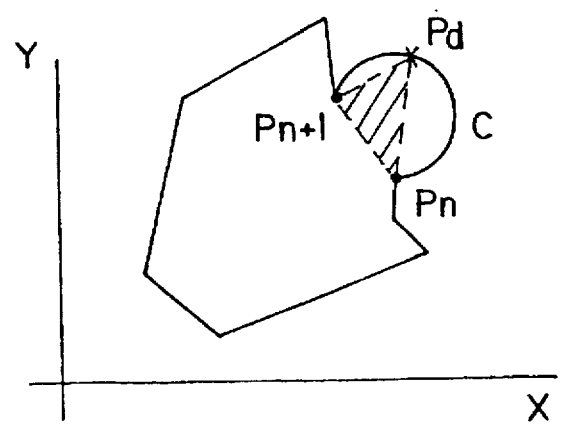
FIG. 12 shows a pattern illustrating an addition of the circular arc portion shown in FIG. 11 to a polygon.
Figure 13:
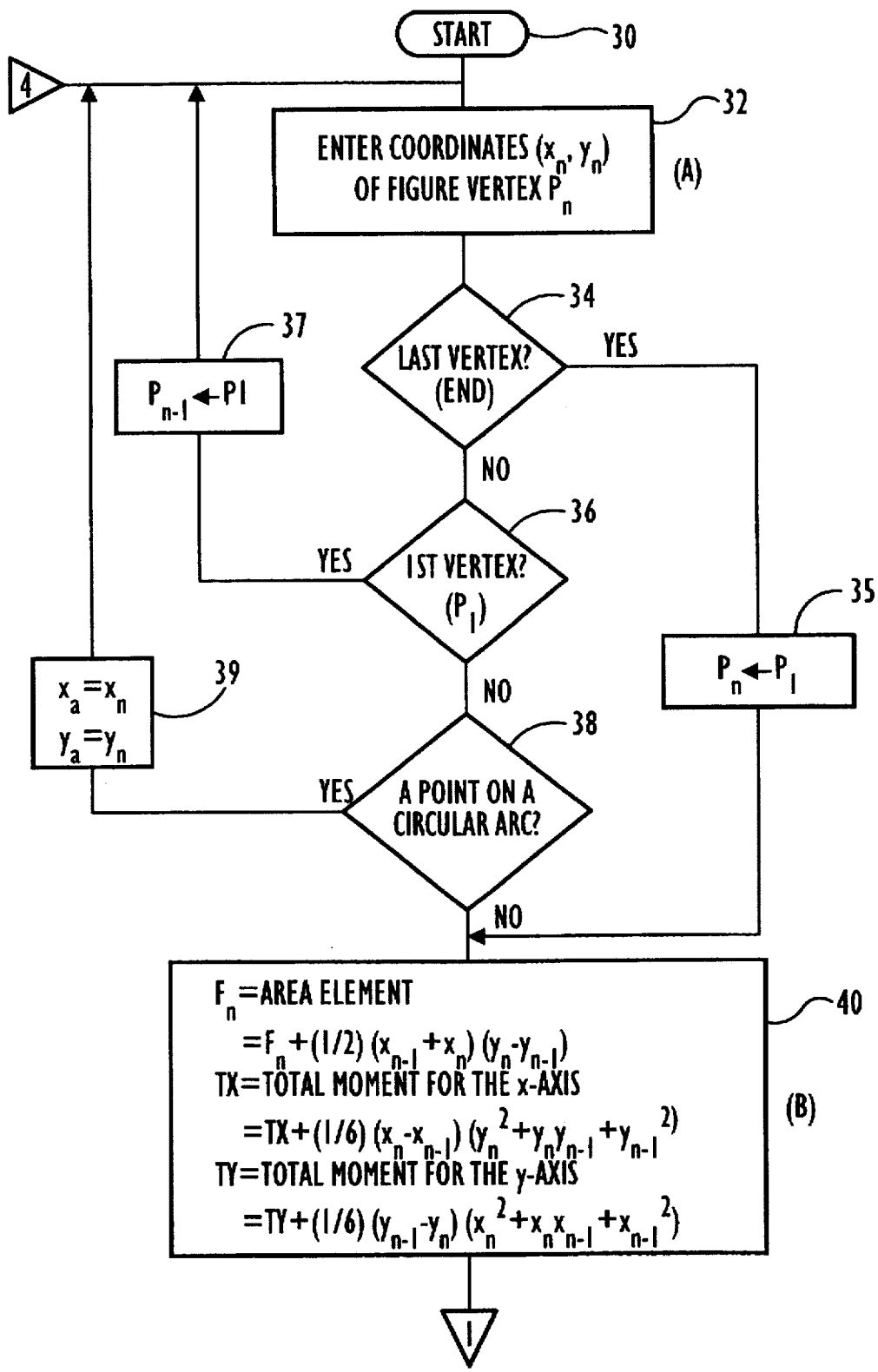
FIG. 13 illustrates a first part of a flow chart for calculating a centroid of a figure and an area of a circular arc portion using the figure measuring apparatus of the present invention.

The following describes the addition of the geometrical moments of area to the area of the polygon, as shown in FIG. 12 and described in steps 54 through 58 illustrated in FIG. 15.

If $F_n$ denotes an area of the n-side polygon, $F_n$ is calculated by the following equation (described above with respect to step 40):

$$2F_n = \sum_{i=1}^{n} (x_i + x_{i-1})(y_i - y_{i-1})$$

If $F_n$ is determined to be greater than 0, the tracing direction is in the clockwise direction. If $F_n$ is less than 0, the tracing direction is in the counter-clockwise direction.

It is possible to know that the area and the geometrical moment of the area of the arched portion are added or subtracted depending on a sign of the rotation discriminant Da of the circular arc, since a sign of the arc triangle C is the same as that of the area of the arched portion. Since $A_{arc}$, calculated in step 44, can be obtained as a positive value, it should have the same sign of the arc triangle C (e.g., the rotation discriminant Da).

If Da is determined to be less than 0, a new $A_{arc}$ is equal to $-A_{arc}$. If Da is determined to be greater than or equal to 0, a new $A_{arc}$ is equal to $A_{arc}$. Meanwhile, $F_n$ is equal to $F_n$ and the new $A_{arc}$. This is discussed above with respect to step 58. Since $F_n$ can be either a positive value or a negative value, the final area TA is given by ABS($F_n$), as described above with respect to step 64.

Further, the geometrical moments TY and TX of the area are calculated by the following equations (as described above with respect to step 40):

$$TX = (1/6) \sum_{i=1}^{n} (x_i - x_{i-1})(y_i^2 + y_i y_{i-1} + y_{i-1}^2)$$

$$TY = (1/6) \sum_{i=1}^{n} (y_i - y_{i-1})(x_i^2 + x_i x_{i-1} + x_{i-1}^2)$$

The addition or subtraction of the geometrical moments of the area of the arched portion to the geometrical moments TY and TX are determined in accordance with the turning direction of the circular arc, as follows:

If Da is less than 0 (e.g., a clockwise turning of the circular arc exists), then:

$TY = TY + My$, and $TX = TX + Mx$         (4)

If Da is greater than or equal to 0 (e.g., a counter-clockwise turning of the circular arc exists), then:

$TY = TY - My$, and $Tx = Tx - Mx$         (5)

Equations 4 and 5, above, are summarized, as follows:

If Da is less than 0, then:
New My is equal to My, and
New Mx=Mx.
If Da is greater than or equal to 0, then:
New My=My*(−1), and
New Mx=Mx*(−1).
TY=TY+new My, and
TX=TX+new Mx.

It is noted that the above was discussed previously with respect to step 58, discussed above.

If the tracing of the figure is completed, in the case where $F_n$ is greater than 0 (indicating the tracing was in the counter-clockwise turning), then:
TY=TY*(−1), and
TX=TX*(−1).

It is noted that the above was previously discussed above with respect to step 63.

Further, as discussed above with respect to step 64, the area TA of the whole figure is determined by:
TA=ABS ($F_n$),
and the coordinates TGx and TGy of the centroid of the figure are determined by:
TGx=TY/TA, and
TGy=TX/TA.

It is noted that any number of circular arcs may exist with the present process.

While the figure described above is a polygon that includes circular arcs, the present invention may also be applied to the measurement of circular arcs of figures having curved profiles.

The present invention greatly simplifies the measurement of n-side polygons and curved figures having circular arcs. Specifically, the measuring apparatus of the present invention has the coordinates at both ends of a circular arc and at an intermediate point of the circular arc entered thereto to calculate the length or area of an arched portion that is bounded by the circular arc, in order to add to or subtract from the n-side polygon or the figure of the curved profile.

Having described a preferred embodiment of the invention with reference to the accompanying drawings, it is to be understood that the invention is not limited to embodiment discussed herein, and that various changes and modifications may be effected therein by one skilled in the art without departing from either the scope and/or spirit of the invention as defined in the claims.

I claim:

1. A measuring apparatus for measuring at least one of coordinates or an area of a figure, comprising;

a main body having a pair of rollers to drive said measuring apparatus in a running direction;

a measuring lever that is pivotally supported by said main body so as to be rotatable in a left direction and a right direction relative to said running direction of said main body in a horizontal plane, said measuring lever having a tracer that traces a contour of the figure to be measured;

first means for inputting coordinates designating a first location where said tracer is positioned; and second means for inputting coordinates designating a second location where said tracer is positioned when said tracer is located at a point on a circular arc, wherein said main body further comprises:

a display; and a calculator, wherein said calculator computes geometrical moments $Tx_i$ and $Ty_i$ for an x-axis and a y-axis, and an area $F_i$ of an element defined by successive adjacent coordinates $(x_{i-1}, y_{i-1})$ and $(x_i, y_i)$, where i equals 1 to n, and $(x_n, y_n)=(x_1, y_1)$ inputted by said first inputting means, said calculator adding values of $Ty_i$ and $Tx_i$ and $F_i$ to values of $Ty_{i-1}$, $Tx_{i-1}$ and $F_{i-1}$, respectively, as said measuring lever traces said contour of the figure to be measured, said calculator computing geometrical moments Mx and My for said x-axis and said y-axis and an area $A_{arc}$ of an arched portion bounded by a circular arc passing through said coordinates $(x_{i-1}, y_{i-1})$, $(x_i, y_i)$ inputted by said first inputting means and coordinates $(x_a, y_a)$ inputted by said second inputting means to one of adding said values Mx, My and $A_{arc}$ to $Tx_i$, $Ty_i$ and $F_i$, respectively, and subtracting said values Mx, My and $A_{arc}$ from $Tx_i$, $Ty_i$ and $F_i$, respectively, said calculator dividing said summed values of $Ty_i$ and of $Tx_i$ by said summed value of $F_i$, respectively, in order to obtain coordinates of a centroid of the figure after the contour of the figure is completely traced, said display functioning to display a difference of a current coordinate of said measuring lever from a coordinate of said centroid of the figure.

2. The measuring apparatus of claim 1, wherein said first inputting means is manipulated when said tracer is at a starting point and an ending point of said circular arc, said second inputting means being manipulated when said tracer is at an intermediate point of said circular arc, so that said calculator computes at least one of said area and said centroid of the figure of said arched portion bounded by said circular arc portion.

3. The measuring apparatus of claim 1, wherein said calculator adds said area $A_{arc}$ of said arched portion bounded by said circular arc to said area $F_i$ when a tracing rotation direction of said circular arc portion is the same as that of the whole figure.

4. The measuring apparatus of claim 3, wherein said calculator subtracting said area $A_{arc}$ of said arched portion bounded by said circular arc from the area Fi when a tracing rotation direction of said circular arc portion is opposite to that of the whole figure.

5. The measuring apparatus of claim 1, wherein said calculator subtracting said area $A_{arc}$ of said arched portion bounded by said circular arc from the area Fi when a tracing rotation direction of said circular arc portion is opposite to that of the whole figure.

6. A measuring apparatus for measuring at least one of coordinates or an area of a figure, comprising;

a main body having a pair of rollers to drive said measuring apparatus in a driving direction;

a measuring lever that is pivotally supported by said main body so as to be rotatable in a left direction and a right direction relative to said running direction of said main body in a horizontal plane, said measuring lever having a tracer that traces a contour of the figure to be measured;

first means for inputting coordinates designating a first location at which said tracer is positioned; and second means for inputting coordinates designating a second location at which said tracer is positioned when said tracer is located at a point on a circular arc, wherein said main body further comprises:

a display; and a calculator, said calculator computing a dimensional parameter $F_i$ of an element defined by successive adjacent coordinates $(x_{i-1}, y_{i-1})$ and $(x_i, y_i)$, where i equals 1 to n, and $(x_n, y_n)=(x_1, y_1)$ inputted by said first inputting means, said calculator adding a value of said dimensional parameter $F_i$ to a value $F_{i-1}$ as said measuring lever traces said contour of the figure being measured, said calculator computing a dimensional parameter $A_{arc}$ of an arched portion bounded by said circular arc passing through coordinates $(x_{i-1}, y_{i-1}), (x_i, y_i)$ inputted by said first inputting means and coordinates $(x_a, y_a)$ inputted by said second inputting means to one of adding said value $A_{arc}$ to $F_i$ and subtracting said value $A_{arc}$ from $F_i$ to obtain a dimensional parameter of the whole figure, said display functioning to display a value corresponding to $F_n$ of the whole figure calculated by said calculator.

7. The measuring apparatus of claim 6, wherein said first inputting means is manipulated when said tracer is at a starting point and an ending point of said circular arc, said second inputting means being manipulated when said tracer is at an intermediate point of said circular arc, so that said calculator computes the dimensional parameter $A_{arc}$ of said arched portion bounded by said circular arc portion.

8. The measuring apparatus of claim 6, wherein said calculator adds said value $A_{arc}$ of said arched portion bounded by said circular arc to said value $F_i$ when a tracing rotation direction of said circular arc portion is the same as that of the whole figure.

9. A measuring apparatus for measuring figures having a circular arc, comprising:
   a main body, comprising:
      means for driving said main body in a running direction; and
   a processor;
      means for tracing a contour of a figure having a circular arc portion, as said main body is driven in said running direction, to determine a starting point, an ending point and an intermediate point of said circular arc portion;
   first means for inputting said starting point and said ending point of said circular arc portion;
   second means for inputting said intermediate point of said circular arc portion, wherein said processor processes said starting point, said ending point and said intermediate point to obtain coordinates of a centroid of the figure after the contour of the figure is completely traced by the tracing means.

10. The measuring apparatus of claim 9, further comprising:
   a display unit that displays a difference between a current coordinate of the measuring apparatus and said centroid of the figure.

11. The measuring apparatus of claim 9, wherein said processor determines said coordinates of said centroid of the figure by calculating geometrical moments for an x-axis and a y-axis, and additionally computes an area of the figure as said measuring apparatus traces the contour of the figure.

12. The measuring apparatus of claim 9, further comprising a measuring lever that houses said tracing means, said first inputting means and said second tracing means, said measuring lever being rotatable in a clockwise and a counter-clockwise direction of a horizontal plane relative to said running direction of said main body.

* * * * *

UNITED STATES PATENT AND TRADEMARK OFFICE
CERTIFICATE OF CORRECTION

PATENT NO. : 5,708,592
DATED : January 13, 1998
INVENTOR(S) : K. KAJI

It is certified that error appears in the above-identified patent and that said Letters Patent is hereby corrected as shown below:

On the cover page of the printed patent, paragraph [56] FOREIGN PATENT DOCUMENTS, line 2, insert the following:

```
---   4-208013   8/1991    Japan
      62-119407  5/1987    Japan
      5-537682   9/1980    Japan
      5-31721    5/1993    Japan---.
```

At column 14, line 1 (claim 1, line 21), change "$(x_{i-}, y_{i-1})$" to ---$(x_{i-1}, y_{i-1})$---.

Signed and Sealed this

Sixth Day of October, 1998

Attest:

BRUCE LEHMAN

*Attesting Officer*  *Commissioner of Patents and Trademarks*